United States Patent Office.

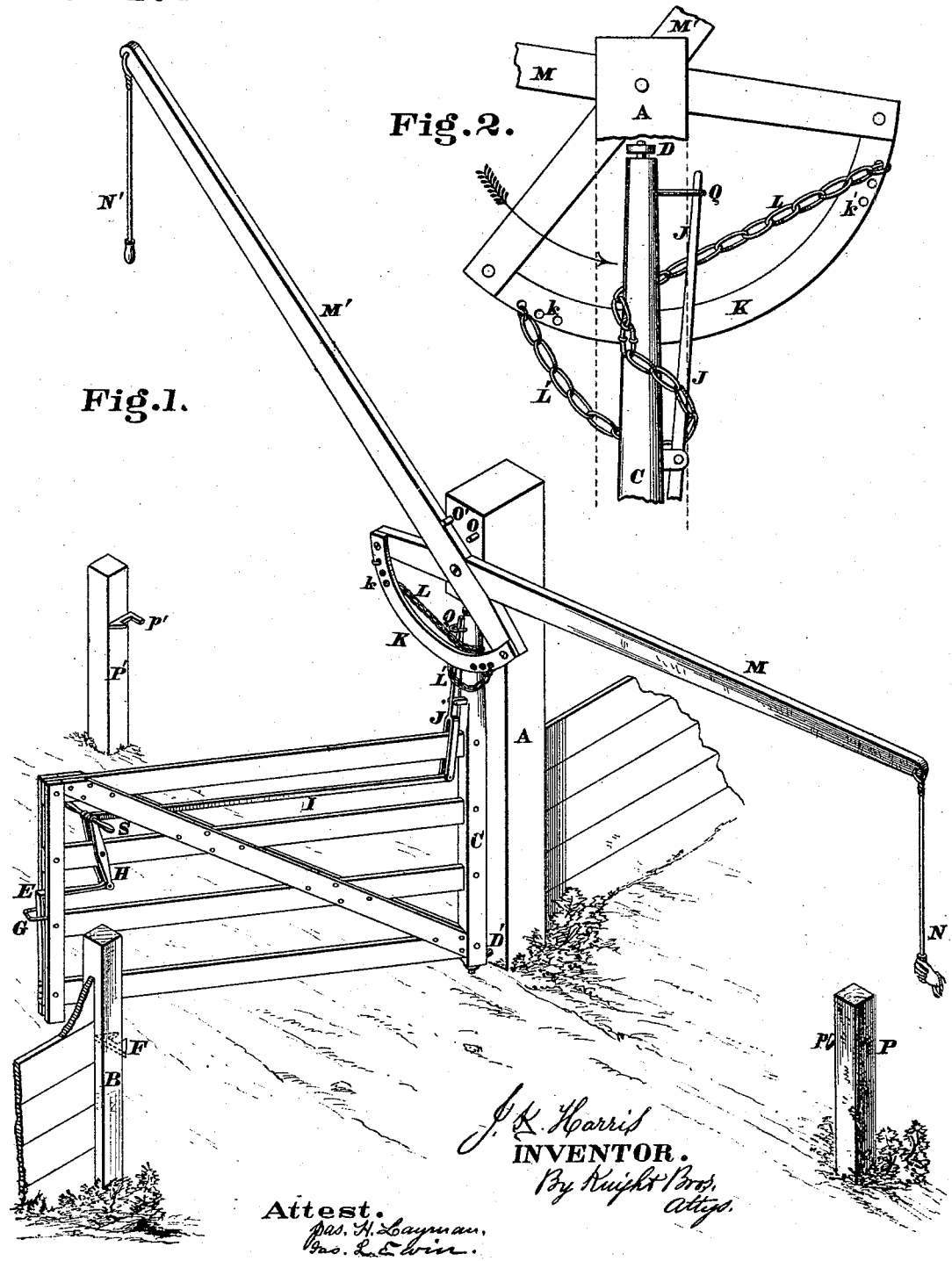

JOHN K. HARRIS, OF SPRINGFIELD, OHIO.

Letters Patent No. 111,201, dated January 24, 1871.

---

IMPROVEMENT IN GATES.

---

The Schedule referred to in these Letters Patent and making part of the same.

---

I, JOHN K. HARRIS, of Springfield, Clark county, Ohio, have invented a new and useful Device for Opening and Closing Gates, of which the following is a specification.

Nature and Objects of the Invention.

My invention relates to an arrangement whereby a gate may be conveniently opened or closed, and retained firmly in either position, by a person on a horse or in a vehicle, when approaching the gate from either direction, all the movements employed for this purpose being simple and positive, and not depending on the gravitation of the gate for their operation.

My arrangement dispenses with all cog-gearing, cams, or pulleys; and all the metallic parts can be easily made by a common blacksmith.

I employ two levers joined together, near one end, in the form of a cross, their said ends being connected by a segment-bar.

These levers are pivoted at their point of intersection to a projection on the inside of the same post to which the gate is hinged, and extend on each side of the gate a sufficient distance to be of easy access to the rider.

Their alternate action, through the instrumentality of the simple devices hereafter described, first withdraws the latch and then opens or closes the gate, as desired.

General Description with Reference to the Drawing.

Figure 1 is a perspective view of a gate provided with my apparatus.

Figure 2 is an enlarged rear view of a portion of the apparatus.

A represents the main stationary post to which the gate and levers are pivoted.

B represents the fence-post, provided with an ordinary double catch, F, in which the spring-latch E engages when the gate is closed from either direction.

The gate-post proper C extends two or more feet above the top of the gate, and is pivoted at top and bottom to eyes or sockets, D D', attached to the stationary post A.

E is a customary vertical spring-latch, which engages, when the gate is closed, in a common right-and-left catch, F, on the fence-post B, as before stated, and, when the gate is thrown open to either side, engages in a catch, p or p', on the stop-post P or P'.

This spring-latch is limited in its outward play by staple G, which may be adjustable, and has its upper end bent so as to pass through a slot or mortise in the gate-frame.

Pivoted to the end of the spring-latch is the lower end of a short vertical lever, H, which is also pivoted at or near its middle to the gate.

The upper end of lever H is provided with a handle, S, and is connected to a rod, I, extending horizontally, and connected to the lower end of a vertical latch-lever, J, which is pivoted to the inside of the gate-post C, at a point below the coil of chain hereafter described, and is provided with a guide-staple, Q, at its upper end.

K is a vibrating segment-bar, attached to the ends of levers M M', and provided with two series of holes, k k', for the engagement of opposite ends of the chain or rope L, whose middle portion is wound once around the gate-post C and latch-lever J.

The middle of this chain or rope is permanently fastened to the rear side of the gate-post C in such a manner as to allow one part to wind around the post and lever a few inches above the other; or the two portions may consist of two distinct chains or ropes, one end of each being attached to the gate-post C at different elevations, but in or about the same vertical line.

Extending from opposite ends of the vibrating segment K are the operating levers M M', which are provided with pendent knobs or handle, N N', in convenient position for the hand of the rider.

Stops, O O', projecting from the post A, serve to limit the motion of either lever.

On each side of post A, and at the same distance therefrom as the fence-post B, there is a fixed stop-post, P P', having a catch and stop, as represented, to arrest the gate and hold it firmly in latch when in its wide open position, and thus prevent its being blown back by wind, or otherwise accidentally closed against the team or vehicle.

These arresting and holding-posts may be placed in line with post A, as represented, or as far in the rear thereof as the gate is desired to open.

Operation.

The gate being closed, and the chain being crossed loosely over the latch-lever J, the rider, approaching from either side, pulls down the lever accessible to him, the first action of which is to draw tight that part of the chain or rope attached to the further end of the segment.

This tension presses the upper end of the latch-lever J against the gate-post C, and thus operates to withdraw the latch.

The part of the chain under tension then operates to pull the gate around until its latch engages with the catch p or p', as the case may be; the other half of the chain, being slack, presents no impediment to the action of the latch with the catch.

The rider having passed through, and desiring to close the gate, simply depresses the other lever, which brings the other or slack portion of the chain tight around the latch-lever J, again disengages the latch, and, by a simple reverse motion, swings back the gate to its closed position.

Thus it will be seen that all the motions actuating the gate are positive and effective, and do not depend at all on gravitation, as in some devices for this purpose, and are not subject to be interrupted by wind or other causes, nor does the gate under any circumstances open or close against the rider.

Having thus described the construction and operation of my invention in combination with a suitable gate and ground-posts,

I claim—

The arrangement of levers M M', chain or rope L, and vertical latch-lever J, the latter being connected to the described or any ordinary spring-latch for the purpose of opening and closing the gate from opposite directions, substantially as herein described.

In testimony of which invention I hereunto set my hand.

JOHN K. HARRIS.

Witnessss:
GEO. H. KNIGHT,
JAMES H. LAYMAN.